United States Patent [19]

Essig et al.

[11] Patent Number: 4,715,569
[45] Date of Patent: Dec. 29, 1987

[54] FASTENING MECHANISM FOR MOUNTING OPERATING EQUIPMENT AND THE LIKE

[75] Inventors: Willi Essig, Boeblingen; Robert Kicherer, Oberderdingen; Hans Mayer, Kuernbach, all of Fed. Rep. of Germany

[73] Assignee: EGO Elektro-Geräte Blanc u. Fischer, Fed. Rep. of Germany

[21] Appl. No.: 872,513

[22] Filed: Jun. 10, 1986

[30] Foreign Application Priority Data

Jun. 15, 1985 [DE]  Fed. Rep. of Germany ....... 3521634
Apr. 19, 1986 [DE]  Fed. Rep. of Germany ....... 3613295

[51] Int. Cl.⁴ ............................................... G12B 9/00
[52] U.S. Cl. .................................... 248/27.1; 200/295; 200/296
[58] Field of Search ............... 248/27.1, 27.3, 222.3, 248/221.3; 339/128, 125 R, 126 R; 200/295, 296

[56] References Cited

U.S. PATENT DOCUMENTS

| | | | |
|---|---|---|---|
| 2,757,353 | 7/1956 | Opalenik et al. | 339/128 |
| 3,332,648 | 7/1967 | Selinder | 248/27.3 |
| 3,350,531 | 10/1967 | Koepke | 200/167 |
| 3,430,188 | 2/1969 | Leach | 339/128 |
| 3,681,593 | 8/1972 | Genovese et al. | 248/27 X |
| 4,072,840 | 2/1978 | Daigle | 200/296 |
| 4,105,883 | 8/1978 | Hastings et al. | 200/296 |
| 4,208,558 | 6/1980 | Alsch | 248/27.3 X |
| 4,346,274 | 8/1982 | Mutschler et al. | 200/295 X |
| 4,398,073 | 8/1983 | Botz et al. | 248/27.3 X |
| 4,586,843 | 5/1986 | Heng et al. | 339/128 X |
| 4,596,369 | 6/1986 | Essig et al. | 248/27.3 |

FOREIGN PATENT DOCUMENTS

| | | |
|---|---|---|
| 1098565 | 8/1961 | Fed. Rep. of Germany . |
| 1765572 | 7/1971 | Fed. Rep. of Germany . |
| 1765266 | 7/1971 | Fed. Rep. of Germany . |
| 2251676 | 10/1972 | Fed. Rep. of Germany . |
| 7242212 | 4/1974 | Fed. Rep. of Germany . |
| 7717660 | 12/1977 | Fed. Rep. of Germany . |
| 2930719 | 7/1979 | Fed. Rep. of Germany . |
| 2028647 | 10/1970 | France . |

Primary Examiner—Ramon O. Ramirez
Attorney, Agent, or Firm—Steele, Gould & Fried

[57] ABSTRACT

A fastening mechanism for mounting operating equipment or the like, particularly on electric household equipment has bayonet catch-like tension members for engaging in a panel. Each tension member can have in a slightly resiliently movable region on one side, a shoulder surface for the inclined supporting on the outside of the panel and on the other side can have a wedge surface for the self-cutting engagement in a boundary edge of a passage opening of the panel. Accompanied by self-compensating position adaptation, the tension member is not only braced with the shoulder surface under pretension against the outside of the panel, but is also wedged at right angles thereto in the passage opening.

24 Claims, 15 Drawing Figures

FASTENING MECHANISM FOR MOUNTING OPERATING EQUIPMENT AND THE LIKE

The invention relates to a fastening mechanism for mounting or securing operating or functional equipment, such as control means, for example electrical power control and switching means, etc., in the vicinity of an opening on a panel, such as an equipment shield or the like, with holding members associated with the equipment body and to be supported on both sides of the panel and which have supporting surfaces for support purposes, there being at least one holding member constructed as a tension member engaging in the fixing position with pretension and arranged in an at least slighly movable manner on the equipment body with respect to the boundary of the opening.

In many fields, particularly in the case of electrical equipment, components, such as control, regulating, switching, indicating, monitoring and similar means are fixed to counterparts, which are generally referred to as panels, fixing taking place by using bending members, cap screws, threaded bolts with nuts, cotter pins with ball slips, bayonet catches and the like, which are passed through corresponding openings in the panel and then in the vicinity of at least two facing sides of the passage opening are supported against the associated side of the panel under tension using the bending member head, screw head, nut, ball clip, catch head or the like. Generally a mirror symmetrical support is chosen on either side of a median plane of the tension member and the most varied means are used to attempt to bring about a self-locking of the tension member relative to the panel, so as to counteract any loosening of the fixture. Particularly in the case of electrically heated equipment, apart from the vibrations occurring during use, there is also frequently considerble thermal stressing which, due to differing thermal expansion and the bringing about of material changes, helps to loosen such fixtures.

For example, a fastening mechanism is known (U.S. Pat. No. 3,332,648), having for the engagement on the inside of the panel hook-like holding members, for the engagement on the outside of the panel a plate-like holding member and a further holding member constructed as a tension member engaging radially resiliently outwards in the manner of a spring trigger in the boundary of the circular opening. In the case of such a construction a relatively small force acting at right angles to the panel on the device is sufficient to overcome the holding force of the tension member and therefore eliminate the fixing action of the device. Such a fastening mechanism is only suitable for those means in which operation or other conventionally occurring external influences only lead to very limited forces.

A fastening mechanism for a switch is also known (offenlegungsschrift, DE-OS No. 22 51 676), in which spreading or expanding fingers projecting resiliently in barb-like manner are provided on the switch body and which spring outwards at the end of the insertion of the switch into the opening, thereby engaging behind the inside of the panel. However, as a result of their operating mode, such spreading fingers cannot engage with pretension on the associated side of the panel, so that it is not possible in this way to fix a switch in a completely play-free manner.

A play-free fixing of a switch is known (U.S. Pat. No. 4,398,073), in which the switch body has spring fingers, which are supported on the inside of the panel and tension the switch inwards engaging on hook-like locking members. However, the locking engagement is not provided directly in the vicinity of the panel, so that this must be provided on the inside with a space-consuming, complicated mounting for the switch.

It is common to all these fastening mechanisms that the supporting surfaces of their tension members, due to tolerance or dimensional differences in the interengaging parts, are supported with different zones on the panel and therefore usually only at unfavourable points in punctiform or very narrowly defined manner, which leads to unfavourably high surface pressures and therefore to constraints regarding material selection.

The problem of the present invention is to provide a fastening mechanism of the aforementioned type, which offers a high security against loosening, while having a simple construction and being easy to handle.

According to the invention this problem is solved in that at least one tension member has a head portion on a tension-loaded shank or shaft portion and said head portion forms at least one of the supporting surfaces and that for position compensation of the supporting surface with respect to the panel under the supporting force which occurs, the tension member is resiliently movable in the manner of at least one articulation zone.

Thus, the tension member is so set, not only in the main tension direction, but also in a direction at right angles thereto with respect to the counterpart having the passage opening that an extremely durable reliable hold, e.g. in the manner of a wedging of the tension member with respect to the counterpart or the boundary of the passage opening is obtained.

Instead of this and in particular in addition thereto, it is also conceivable for at least one boundary edge of the inner face of the passage opening to form at least one cutting edge for penetrating the tension member, so that there is a direct additional locking positive connection between the counterpart and the tension member.

For solving this problem, in addition thereto or instead thereof, a fastening mechanism can be so constructed according to the invention that at least one tension member is formed for bearing on the associated side of the panel which is at least partly outside the boundary of the opening in the fixing position and for self-compensating bearing it is resiliently pivotable over the extension of its support surface positioned transversely to the articulation axis of its articulation zone with respect to the body of the means by at least one further articulation zone spaced from the first articulation zone.

Thus, the supporting surface can be moved within the constructionally caused limits in the manner of a parallelogram guide in plane-parallel or translatory manner in the pressing direction which is generally at right angles to the bearing surface, so that it engages over its entire extension in any position within said limits. The supporting surface, which is consequently provided on a portion of the tension member mounted by means of an at least two-jointed spring bracket on the body of the means and to this extent is part of an at least three-membered, resilient articulated arm, compensates this plane-parallel engagement in simple manner in that it assumes slightly differing positions as a function of the actual size in a direction at right angles to the articulation axis of at least one articulation zone. As the supporting surface can be directly or indirectly supported or engaged not in the vicinity of the boundary of the opening, but outside said boundary and exclusively on the associated side of the panel, the tension can be made very high. Thus, particularly for regulating and control equipment, e.g. manually operable temperature regulators or for those means which are exposed to high forces during use or operation at right angles to the panel and/or rotating about an axis positioned transversely to the panel, a screwless fixing can be obtained, which can be in the manner of a clip fastening, so that no particularly high demands must be made on the tension member with respect to the elasticity and spring characteristics of the material used, because the resilience is distributed over at least two articulation zones. Thus, relatively rigid materials, e.g. plastics, thermoplastics, fibre glass-reinforced polyamides, etc. can be used, which are relatively dimensionally rigid even in the case of small cross-sections and are therefore suitable for transferring high tensions. As in all cases the tension is uniformly distributed over the bearing surface, there is also a considerble reduction to the risk of the high specific surface pressure leading to a material flow. In the case of sheet metal panels, the thickness tolerances are generally only a few hundredths or a few tenths of a millimeter, e.g. ±0.06 mm. By corresponding dimensioning, the fastening mechanism can also be designed in such a way that much larger dimensional differences can be compensated, so that it is equally well suited for panels of different thicknesses. Apart from plane-parallel, the tension member with its supporting surface can possibly be automatically set to differing sloping positions of the mating surface.

According to another feature of the invention, at least one supporting surface provided as a transverse clamping or gripping surface has a wedge surface particularly for engaging on the associated boundary edge of an edge face of the passage opening and which is preferably at an acute angle opening towards the head end with respect to the median plane and on engaging the tension member with the panel is secured under wedging or keying action against the associated boundary edge, which can then additionally penetrate said wedge surface in the described manner, whilst forming a corresponding depression.

The outer face of the tension member remote from this wedge surface then forms in the vicinity of the facing side of the edge surface of the passage opening, an abutment surface for the wedging or keying effect.

Appropriately said abutment surface is also formed as a wedge surface, the maximum spacing between the two wedge surfaces being larger than the associated width of the passage opening and the abutment surface assumes with respect to the median plane a smaller wedge angle of preferably only a few angular degrees. Thus, in the vicinity of the abutment surface, a very small surface and optionally linear supporting effect is obtained, which is therefore accurately defined and has high specific surface pressures.

To permit very reliable supporting in the main tension direction, at least one supporting surface provided as a main tension surface has a shoulder surface, which is preferably constructed in spaced manner outside the associated boundary edge of the passage opening for supporting on the associated side of the panel, i.e. does not engage up to its boundary edge on the panel, so that here again there is automatically a very precisely defined engagement or bearing if the shoulder surface has position change tendencies, due to internal deformations of the tension member. It is conceivable for each supporting surface to be construed both as a transverse tension surface and as a main tension surface, so that it brings about on the one hand a tension component at right angles to the main tension direction and on the other hand a tension component in the main tension direction, particularly with a further surface portion which is optionally at an angle thereto. However, it is particularly appropriate if one supporting surface is constructed in this sense as the main tension surface and as the transverse tension surface, while the other supporting surface is only constructed as a transverse tension surface. To permit the easy compensation, particularly when using several spaced tension members, of any tolerance differences between the position of the tension members and those of the passage openings, a shank or shaft of the tension member carrying the head is in itself, or instead thereof or in addition thereto in conjunction with a base member, made elastically resiliently deformable, particularly in the transverse tenison direction, which readily permits movements in said direction for adapting to the wedged position.

According to another feature of the invention, the articulation axes of the articulation zones of the tension member are at least approximately parallel to one another, so that the movement of the supporting surface parallel to the wall plane is precisely linear in the case of deflections of the articulated bracket. Instead of this or in addition thereto, the articulation axes are appropriately at right angles to one axial plane of the opening or the fastening mechanism, so that in the case of small deflection angles relatively large movements of the supporting surface at right angles to the wall plane are obtained. It is conceivable for both articulation axes of the tension member to be on one side of the panel or the wall plane thereof, i.e. on the inside or outside, so that they are approximately in the engagement plane or only have the distance therefrom necessary for housing the articulation zone. It is therefore possible to provide the articulation axis in such a way that in elevation on the supporting surface, it is located within the projection thereof and is not displaced to the outside with respect to the bearing surface, so that the articulation zone or axis is directly supported in tilting moment-free manner in the tension direction by the supporting surface. The articulation axis can be provided in the vicinity of or close to the centre of the bearing surface extension at right angles to the articulation zone, but is preferably located adjacent to one boundary of this extension, particularly the bearing surface boundary facing the opening.

At least two articulation axes of the tension member can be located in a common axial plane virtually at right angles to the supporting surface or to the wall plane of the panel. However, in order to obtain a geometry of the articulated bracket forming the tension member which is favourable for the spring characteristics, the articulation axes of the articulation zones are at an angle of inclination with repsect to the wall plane. It is advantageous if the articulation axis closer to the bearing surface of the tension member is displaced to the outside with respect to the opening boundary in the panel region free from said opening, while the other, optionally adjacent articulation axis is displaced inwards with respect to said opening boundary.

All parts of the fastening mechanism or all portions of each tension member provided on the means can be constructed in one part and no two-part or multiple-part joints with separate springs are required. Instead film joint-like articulation zones can be provided, whose cross-sections far exceed the size of conventional film joints, have an inherent resilience with very high spring tension and consequently transfer high tensile forces.

For further improving the precisely defined engagement of the engagement surfaces in the case of uniform distribution of the surface pressure, the supporting or engagement surface appropriately does not extend up to the opening boundary, but instead has at least a small distance therefrom, so that it engages on the panel exclusively outside the opening.

A particularly dimensionally stable, compact and easily fitted embodiment of the inventive object is obtained if the holding member to be supported on the other side of the panel wall is arranged in a dimensionally stable or non-resilient manner, so that its supporting surface independently of the tolerances which occur precisely define the position of the means with respect to the associated side of the panel.

Through the choice of a relatively large radius of curvature of a bulge of the supporting surface, it is possible to keep the effective width of said surface relatively large.

Although the inventive construction is possible in the case of an optionally two or multiple-part fastening member of the aforementioned type, a particularly good effect is obtained if the tension members are constructed in the manner of bayonet catch-like projections, which can be engaged with the panel merely by two movements at right angles to one another, namely one movement at right angles to the panel and another movement parallel to its plane, without any additional fixing parts or a detachable arrangement of the tension members on the base member being necessary. Particularly in the case of components to be fixed, which e.g. for control purposes or the like have a member projecting outwards through the panel, such as an actuating or adjusting shaft, it is appropriate for the tension members and passage openings to be arranged in such a way that the tension members can be engaged and disengaged with respect to the panel by rotating about an actuating axis approximately at right angles to the panel. It is particularly appropriate in this case if the transverse tension direction is more particularly radially outwardly directed on the particular tension member with respect to the actuating axis and if the shoulder surface belonging to the main tension surface is provided on the radially outer side of the head. In this case, the hold of the tension member can be further improved in that at least one key or wedge surface is curved around said fixing axis, in the same way as the associated passage opening boundary.

Independently of the curvature of the bearing surface, the provision of an inclined side flank on the bearing surface or on the tension member is particularly advantageous if the opening boundary has a cutout for the bayonet catch-like insertion of the particular tension member. Following the axial insertion of the tension member into said cutout, the tension member must be turned about the central axis of the fastening mechanism for the bayonet engagement, and then the side flank at the front in this rotation direction runs up on to the associated lateral boundary of the cutout and pretensions the tension member until its bearing surface reaches the associated mating surface of the panel adjacent to the cutout. Apart from the opening, the panel requires no special profiled parts in the vicinity of the fastening mechanism and can instead be bounded in plane-parallel manner on its two surfaces. As a result of the bayonet catch-like insertion of the tension member, this need not have a relatively large spring deflection in the manner of a clip, because during insertion the tension member does not have to be deflected over and beyond its fixing position. If such a deflection was provided, the tension member could simultaneously form a locking member to prevent twisting, which in the fixing position engages in a corresponding opposite member, e.g. a panel cutout.

Particularly if no such large deflection of the tension member is provided, appropriately at least one resilient locking member is provided to prevent twisting of the device in the fixing position, so that the prevention of twisting is not solely the responsibility of the tension member or the friction acting thereon. Thus, the fastening mechanism is also suitable for continuously or intermittently operating power control and switching means to be operated by a rotary movement and on which act high rotary forces about the central axis of the fastening mechanism, as are e.g. provided on washing machines. To obtain a positive twisting prevention, the locking member is formed by a spring tongue constructed for engagement in a locking recess in the opening boundary and which is preferably constructed in one piece with the tension member.

This and further features of the preferred further developments of the invention can be gathered from the description and drawings and the individual features can be realized singly or in the form of subcombinations in an embodiment of the invention or in other fields. An embodiment of the invention is described in greater detail hereinafter relative to the drawings, wherein show:

The fastening mechanism 1 shown in FIGS. 1 to 7 for fastening a control means 4 or the like to the inside of a counterpart, e.g. a planar, sheet metal panel 3, essentially comprises only two one-part pieces, namely a flat base part 2 to be arranged on the associated casing side of the control means 4 and the actual panel 3. The control means 4 has an adjusting or actuating shaft 5 passing through base part 2 and the panel 3 and which carries on its end at the outside of panel 3 a handle 6, such as an operating knob and to the extent that it is located on the front of panel 3, covers the base part 2, e.g. in cap-like manner. Base part 2 has holding members engaging under pretension on the inside and outside of panel 3, namely in the form of an opposite member 8 engaging on the inside, a circular flat projection coaxial to the actuating axis 7 and two tension members 9 diametrically opposite to the actuating axis 7 and slightly set back with respect to the outer circumference of the opposite member 8 and which are in each case supported with pretension on the outside of panel 3 by a head 10 within the outer circumference of the opposite member 8. Tension members 9 pass through passage openings 11 in panel 3, which are curved round actuating axis 7 and have in the same direction on one end an insertion portion (12) which is sufficiently wide for the passage of head 10 and following on to the same in the arc or bow direction a retaining portion 13 forming the other end and whose width is correspondingly smaller than that of head 10. Between the passage openings 11, a circular passage opening 14 is provided in panel 3 on actuating axis 7, which is wider than the outer cross-section of adjusting shaft 5 and in which engages a cylindrical sleeve shoulder 15 traversed by the adjusting shaft 5 and with an adequately large radial clearance on the associated side of base part 2 to ensure an alignment of the latter with respect to the panel 3 solely through the engagement of tension members 9 in retaining portions 13. The height of sleeve shoulder 15 is about the same as the thickness of panel 3, so that it does not or only slightly projects over the outside thereof and is set back with respect to the outer ends of the tension members 9. Base part 2 is essentially formed by a flat, plate-like base member 16, which is only a few millimeters thick and over whose one plate side the tension members 9 only project by slightly more than its thickness. Each tension member 9 has a shank 17 carrying the head 10 and which is more slender than the latter and curved round the actuating axis 7 in the manner of an annular cutout, as well as the head 10, head 10 and shank 17 having through end faces located in a common axial plane of actuating axis 7 and extended over an arc angle of less than 45°, particularly approximately 30°. Only in the vicinity of these end faces is shank 17 connected in one part to the base member 16 over the entire thickness, whilst its inner and outer circumferential faces 18, 19 at right angles to the panel 3, are free to the planar side of the base memeber 16 remote from heads 10. These circumferential faces 18, 19, which are in this case on either side of an imaginary envelope surface curved about the actuating axis 7 and here called median plane 20 are in each case bounded by a slot 21 or 22 curved round the actuating axis 7, which traverses the base member 16 over its entire thickness and whose width is smaller than the width of shank 17. The ends of each slot 21 or 22 are located roughly in the planes of the end faces of tension members 9, so that shank 17 forms a step 23 located between slots 21, 22 and curved about the actuating axis 7 and which is only connected at its ends to the base member 16 through a one-part construction and makes it possible for shank 17 to perform slight resilient tilting movements with respect to the base member 16, essentially only in one plane. The head 10 of each tension member 9 has both on its radially inner side facing the actuating axis 7 and on its radially outer side in each case a supporting surface 24 or 25 continuing substantially uniformly over its entire arc extension.

The inner supporting surface 24 projects over the associated, convex edge face 26 and the outer supporting surface 25 over the associated, concave edge face 27 of the retaining portion 13 of the associated passage opening 11 in the vicinity of the outside of panel 3. Each supporting surface 24 or 25 has an equal width, annular cutout-like, planar shoulder surface 28 or 29 located on the outside of panel 3 and substantially forming the inner boundary of head 10. The two shoulder surfaces 28, 29 are in each case inclined to panel 3 under a small angle opening to the side of head 10 belonging to supporting surface 24, but between two end faces of head 10 have substantially constant distance from panel 3. The shoulder surface 28 of supporting surface 24 is displaced by a small amount with respect to the other shoulder surface 29 in the direction of end 32 of head 10. The two shoulder surfaces 28, 29 can be located in a common plane and their described angular position with respect to panel 3 corresponds to the angle given as 33 in FIG. 6 by which the complete head 10 is tilted with respect to shank 17. Thus, only the outer, part ring-shaped boundary edge 34 of shoulder surface 29 remote from shank 17 comes into contact with the associated side, namely the outside of panel 3, whilst the other shoulder surface 28 is normally spaced from said outside 35 and only securingly abuts against the same when the fastening mechanism undergoes serious damage. Cross-sectionally the boundary edge 34 is bounded in approximately rectangular manner, because on the side facing actuating axis 17 and on the side remote therefrom has substantially part cylindrical boundary faces, whose common axis of curvature is tilted by an angle 33 with respect to the actuating axis 7 and pass by means of chamfers into the planar end face at right angles thereto located at the end 32 of head 10.

On the boundary of shoulder surface 28 facing shank 7 is connected a wedge face 36 connecting it to the inner circumferential surface 18 and which is in the form of a concavely curved part cone surface, whose acute angle opening towards the end 32 of head 10 is much larger than angle 33 opposite to median plane 20. Wedge surface 36 extends over such a large portion of shank 17, that it always extends into the retaining portion 13 of passage opening 11. It is appropriately arranged in such a way that when the fastening mechanism is in the fastened position it is located with the center of its height in the vicinity of the outer convex boundary edge 38 of the associated edge face 26 of retaining portion 13 which is roughly coaxial thereto. A further, corresponding, but convex part cone-shaped, curved wedge surface 37 is connected roughly at right angles to the inner boundary of shoulder surface 29 facing shank 17. Surface 29 has at least the same height as the wedge surface 27 having boundary edge 38, but is at a much smaller angle opening in the same direction to the median plane 20 compared with the wedge surface 36. This angle can be roughly the same as angle 33 and is e.g. approximately 5°, while the angle of wedge surface 36 is much larger and is e.g. roughly 25°. The central, radial spacing between wedge surfaces 36, 37 is approximately the same as the spacing between edge faces 26, 27 or between the boundary edges 38, 39 on the outside 35 of panel 3.

After passing the heads 10 of tension members 9 through the insertion portions 12 of passage openings 11, base part 2 with tension members 9 is so turned about actuating axis 7 with respect to panel 3, that the heads 10 are moved into the vicinity of retaining portions 13. The transitions between the inserting portions 12 and the retaining portions 13 are formed by gradually tapered, funnel-like, e.g. part circular, rounded edge portions 40, so that wedge portions 36, 37 can easily be located between edge faces 26, 27. During rotation the boundary edge 38 cuts into wedge surface 36, while simultaneously and as a result of compressive loading on boundary edge 34, head 10 tilts resiliently inwards, so that wedge surface 36 tends to be drawn further into the retaining portion 13 and consequently the boundary edge 38 rises opposite it in the direction of the end 32 of head 10. This leads to an extremely durable wedge bracing between base part 2 and panel 3. At the front end in the rotation direction, part of at least one supporting surface 24 or 25 can be provided with an e.g. sloping intake guide surface, in order to facilitate to a hooking-free insertion into the retaining portion 13. Such a guidance surface 41 is e.g. shown at the associated end of shoulder surface 29. As a result of the described construction tension member 9 only engages with panel 3 in the vicinity of the three curved linear zones, namely in the vicinity of boundary edges 34, 38, 39.

Immediately adjacent to each tension member 9, base member 16 forms a fastening member for fastening the base part 2 to control means 4 and in the represented embodiment the fastening members are formed by screw passage holes 42, which are located in portions of base member 16 which are so depressed with respect to the opposite member 8 that the heads of the fastening screws located in these portions do not project up to the bearing surface of the opposite member 8 or to panel 3. In the represented embodiment, the passage holes 42 are located adjacent to the outer circumference of opposite member 8 on the remote sides of tension members 9, so that the fastening screws can particularly well absorb the forces acting on tension members 9 during the tightening of the fastening mechanism.

For additionally securing base part 2 in the rotation position belonging to its fastening position with respect to panel 3, base part 2 has a securing cam 43, which projects over the bearing surface of opposite member 8 roughly by the thickness of panel 3 and is provided in an axial plane of the actuating axis 7 between tension members 9 outside the outer circumference of opposite member 8. With the securing cam 43 is associated an adapted cam opening 44 in panel 3 for engagement purposes and said cam is shaped in one part from base part 2 and is provided on the face end of a spring bracket 45 located in a cutout in the plane of base member 16 which emanates from the outer circumference of the opposite member 8. Thus, on reaching the fastening position of base part 2, the securing cam 43 automatically engaegs in cam opening 44 and can be unlocked at any time by forcing it back from the outside of panel 3. The fastening mechanism can also be constructed in such a way that it is engaged and disengaged by an e.g. purely translatory relative movement of base part 2 and panel 3 instead of by a rotary movement, i.e. by an approximately rectilinear displacement movement parallel to panel 3. The tension member or all said members are then aligned in the displacement direction, e.g. parallel to one another.

Figure 1:
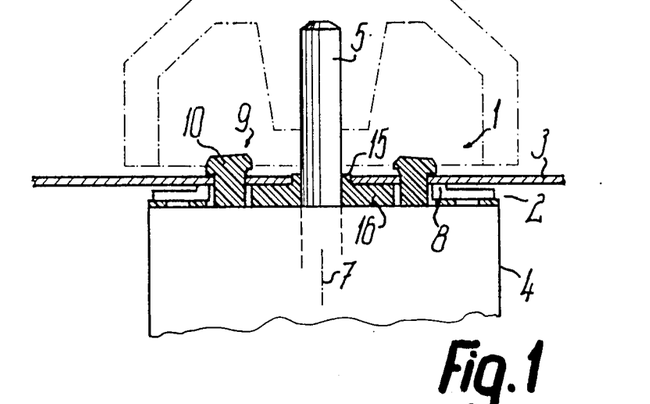
FIG. 1 An axial section through the fastening mechanism according to the invention.
Figure 2:
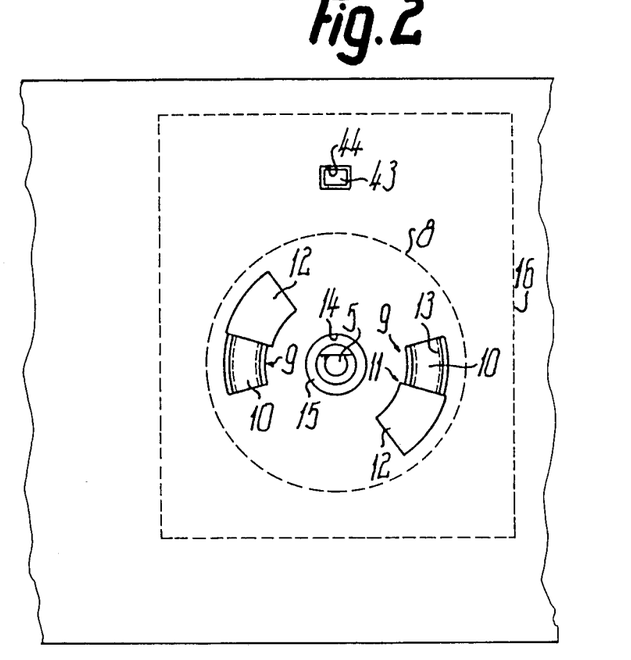
FIG. 2 A plan view of the fastening mechanism of FIG. 1.
Figure 3:
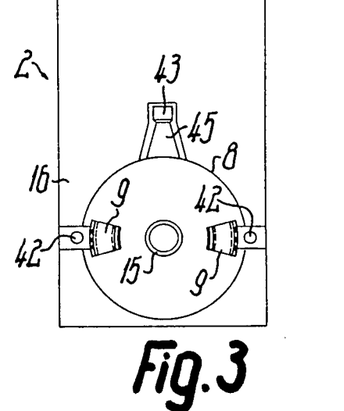
FIG. 3 The base member of the fastening mechanism according to FIG. 1 in plan view and on smaller scale.
Figure 4:
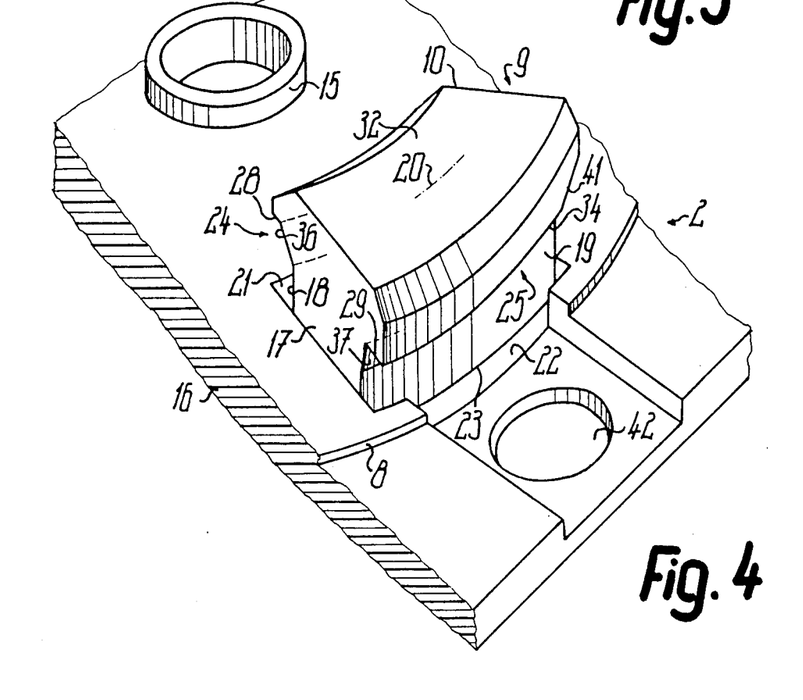
FIG. 4 A larger scale perspective view of a detail of FIG. 3.
Figure 5:
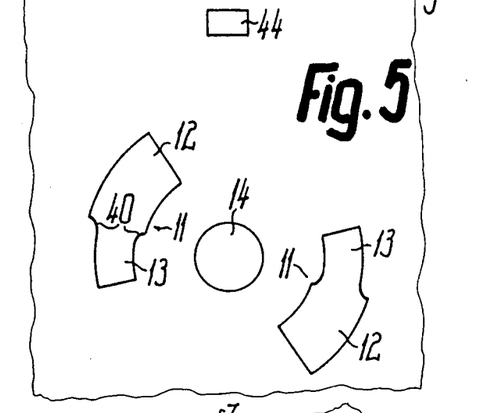
FIG. 5 A detail in plan view of the panel forming the counterpart for the base member.
Figure 6:
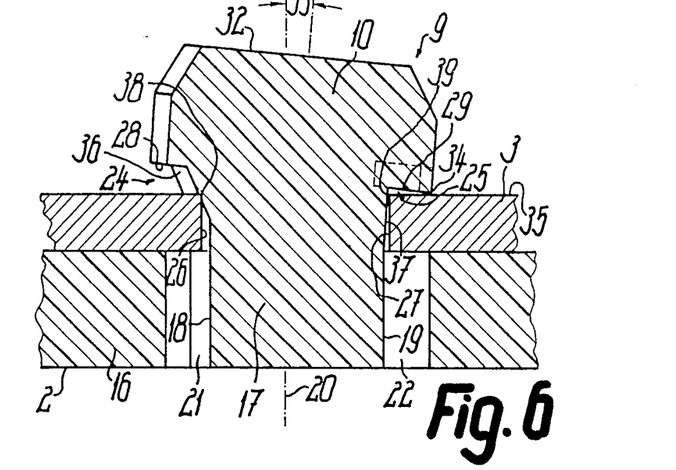
FIG. 6 A larger scale detail of FIG. 1.
Figure 7:
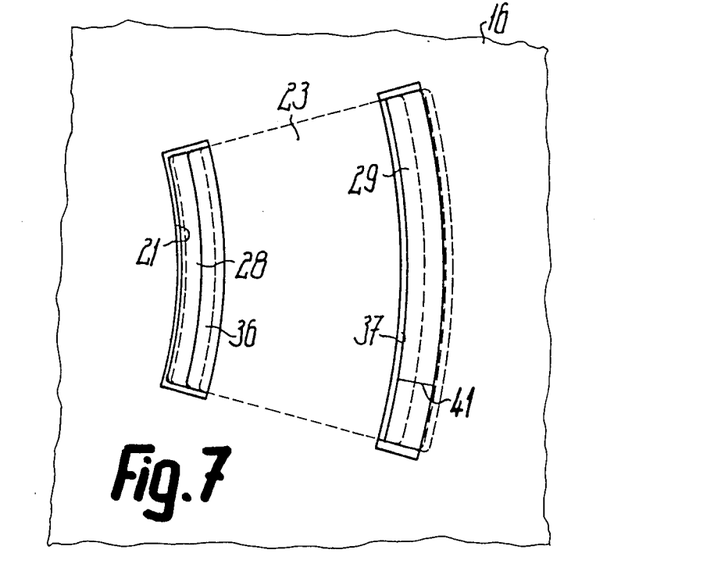
FIG. 7 A view from below of the detail of FIG. 6.
Figure 8:
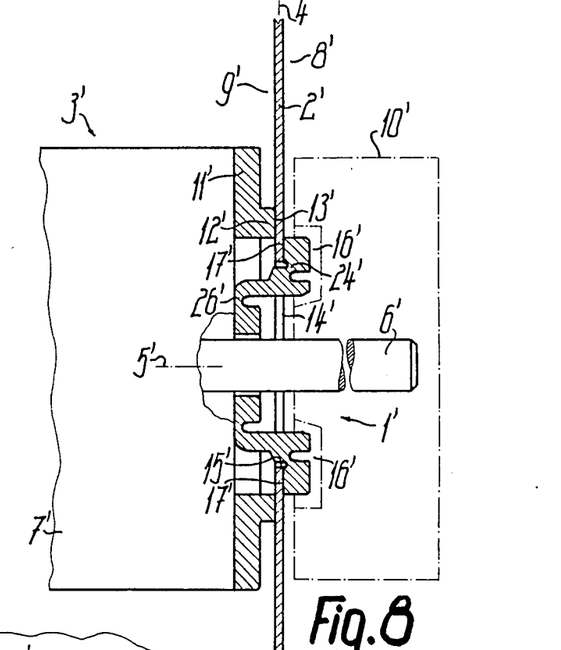
FIG. 8 A fastening mechanism according to the invention in axial section.
Figure 9:
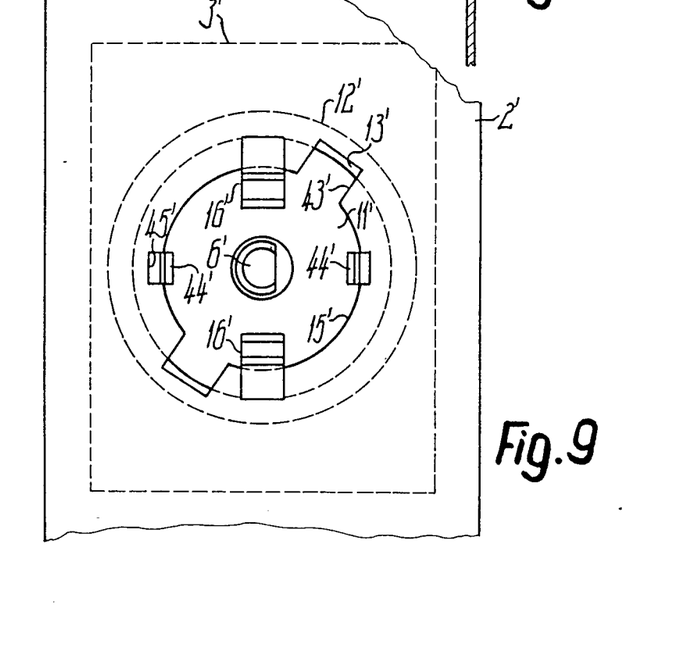
FIG. 9 The fastening mechanism of FIG. 8 in a view from the right.
Figure 10:
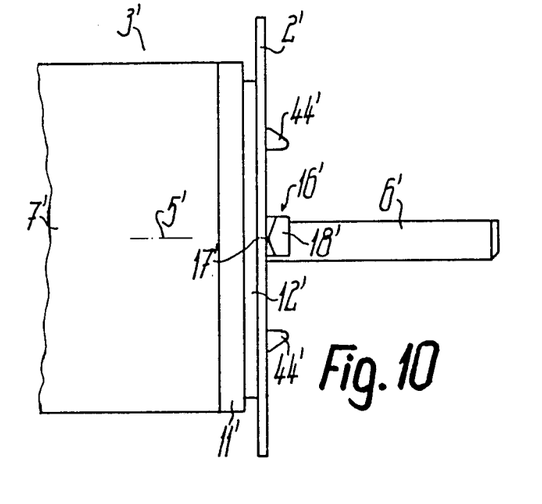
FIG. 10 The fastening mechanism according to FIG. 8, turned by 90°.
Figure 11:
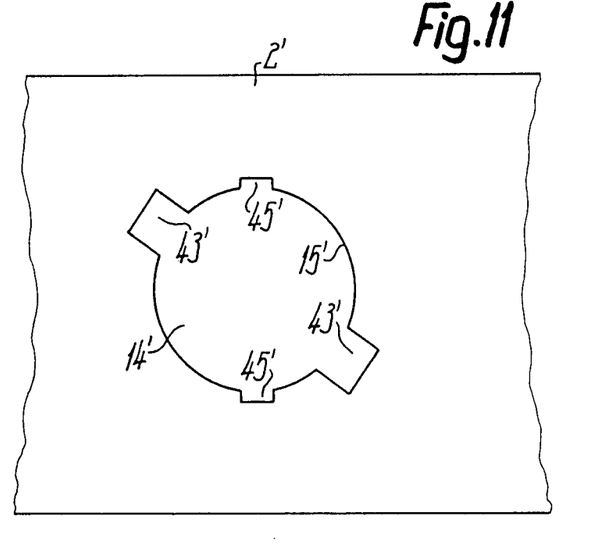
FIG. 11 The panel according to FIG. 10 in a view from the right, and without a fixed means.

The securing cam 43 which, in the case of the construction according to FIGS. 2, 3 and 5 is located outside the circle defined by the two tension members 9, can advantageously also be positioned within this circular region, so that also a small handle 6 in the form of a knob covers it.

As a result of the construction according to FIGS. 8 to 15 a fastening mechanism is obtained which, while ensuring a higher holding or retaining force for the means, also ensures a particularly good and uniform distribution of the surface pressure in the vicinity of the supporting surface of the tension member in the case of the expected tolerance and dimensional differences.

As shown by FIGS. 8 to 15 the fastening mechanism 1' according to the invention has a planar mounting flange or casing cover 11' or the like outside the actual holding members. The internal diameter of holding member 12' or bearing surface 13' is larger than the opening 14' in the vicinity of its circular boundary 15'. The adjusting spindle 6' also passes through a passage opening in casing cover 11', which is much smaller than the diameter of opening 14', the spindle 6' being mechanically connected within the body 7' to the associated operating or regulating members.

Radially within the holding member 12' on casing cover 11' are provided two further holding members facing one another on either side of the central axis 5' and which are in the form of approximately rectangular, Z-shaped tension members 16', which project over casing cover 11' and panel 2' or bearing surface 13' in an outwards direction and engage with supporting surfaces 17' under a pretension directed at right angles to wall plane 4'. Thus, means 3' is fixed in a completely play-free manner with respect to panel 2' on the one hand in the direction of central axis 5' and on the other substantially also at right angles to central axis 5'. The holding or retaining forces are made so large that no relative movements can take place under normal operating conditions between means 3' and panel 2'.

Figure 12:
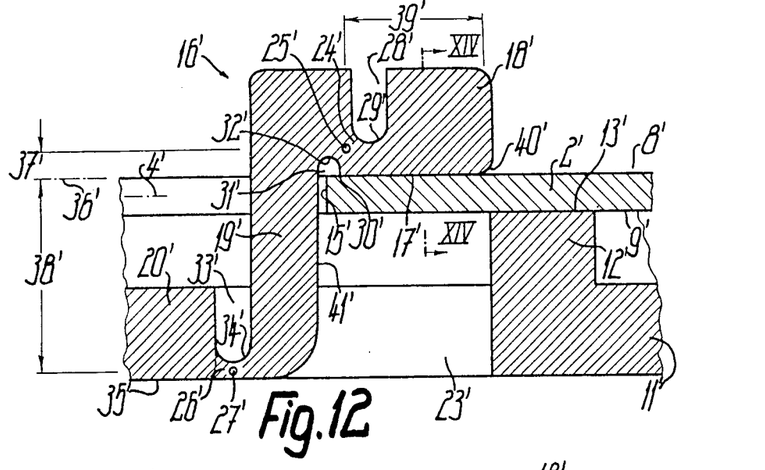
FIG. 12 A larger scale detail of FIG. 8 turned by 90°.
Figure 13:
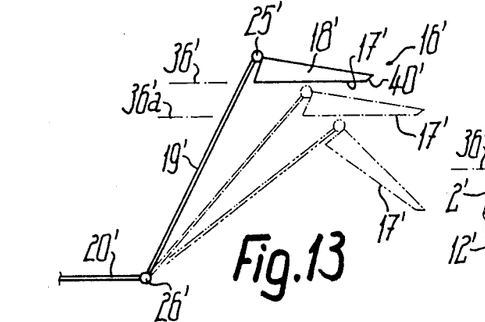
FIG. 13 A diagrammatic representation of the tension member according to FIG. 12.
Figure 14:
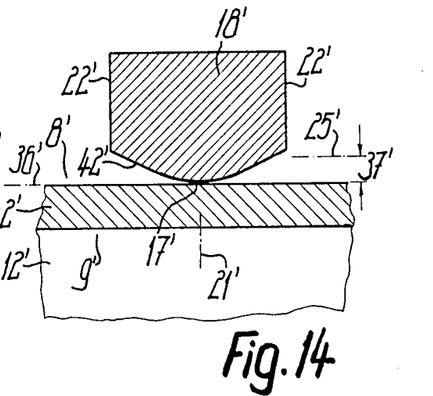
FIG. 14 A section along line XIV—XIV of FIG. 12.
Figure 15:
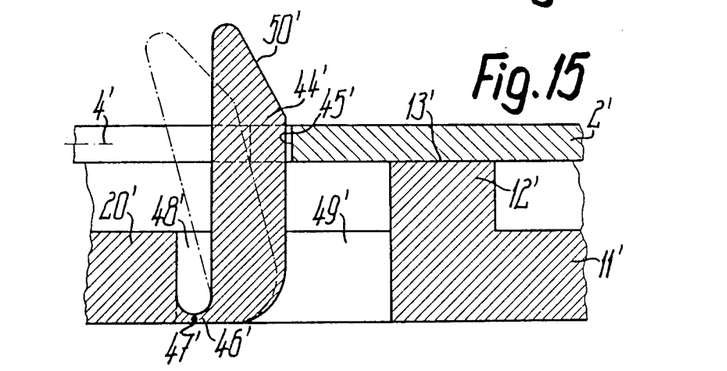
FIG. 15 A detail of FIG. 10 in a representation corresponding to FIG. 12.

As can in particular be gathered from FIGS. 12 to 14, the particular tension members 16' has a head portion 18' on the outside 8' of panel 2', a portion 20' on the inside 9' and substantially parallel to portion 18' and an intermediate portion 19' connecting portions 18', 20'. Portions 18' and 19' are bounded by common lateral faces 22', which are parallel to one another and symmetrical on either side of an axial plane 21' of the fastening mechanism, whilst portion 20' is formed by the plate-like central part of the casing cover 11' closed about the central axis 5' and is only perforated by the passage opening for adjusting spindle 6'. In a view parallel to central axis 5', each tension member 16' is framed by a window-like opening 23' in casing cover 11', which extends up to the inner face of retaining member 12' and whose lateral boundary faces parallel to axial plane 21' are located immediately adjacent to the associated zones of the lateral faces 22' of portion 19', so that the tension member 16' is slideably supported against lateral loading on said lateral boundary faces.

The outer portion 18' of tension member 16' having the bearing surface 17' passes via an articulated zone 24' defining an ideal articulation axis 25' into portion 19', which in turn passes via an articulation zone 26' into portion 20', which defines an ideal articulation axis 27'. According to FIG. 12, articulation axes 25', 27' are at right angles to the same plane and are indicated in this representation by circles. The articulation zones 24', 26' are formed in the manner of film joints by zones, which have a greatly reduced cross-section compared with the adjacent portions 18' to 20'. In the case of the articulation zone 24' on the side of portion 18' remote from bearing surface 17' and parallel to wall plane 4' is provided in the transition region between said portion and portion 19' a slot 28' which is much deeper than the width thereof and which extends over most of the height of portion 18', extends parallel to articulation axis 25' and for bounding articulation zone 24' has on the associated side a cross-sectionally semicircular base surface 29'. On the side of the bearing surface 27' between its associated boundary 30' and the side of portion 19' facing bearing surface 17' is provided a slot-like recess 31', which is much less deep than slot 28' and whose width is smaller than that of slot 28'. Recess 31' parallel to articulation axis 25', according to FIG. 12 has its inner flank in the plane of the side of portion 19' facing bearing surface 17' and according to FIG. 8 can be displaced radially outwards with respect thereto. From the free end of portion 18', recess 31' is displaced with respect to slot 28' at least approximately by the width thereof and has a semicircular base surface 32' on the side opposite to base surface 29' for bounding articulation zone 24'. As a result of the described construction, the cross-section of articulation zone 24' decreases from either side to a region of minimum cross-section, the median plane passing through said minimum cross-section region under an angle opening in the direction of the free end of portion 18' of e.g. approximately 45° with respect to the wall plane 4'.

For the formation of articulation zone 26' in the outside of casing cover 11' on the side of portion 19' remote from portion 18' a slot 33' is provided, whose median plane, like that of recess 31 is parallel to articulation axis 27' and forms an axial plane of said articulation axis. Slot 33', which essentially has the same width and depth of slot 28' is provided with a rounded base surface 34' for bounding articulation zone 26'. On the side remote from slot 33' articulation zone 26' is bounded by the associated surface 35' of casing cover 11' remote from portion 18, which is planar in this region or planar over the entire casing cover 11' and is at right angles to median plane 5'. Thus, articulation zone 26' is much nearer to the side of casing cover 11' remote from portion 18' than to its other side or immediately following the side formed by surface 35'. One lateral flank of slot 33' is in one plane with the side of portion 19' remote from portion 18' and forms part of its associated outer surface.

As a result of the described construction the two articulation axes 25', 27' are on either side of the wall plane 4' or the bearing plane 36' of bearing surface 17' parallel thereto. the distance 37' from articulation axis 25' to bearing plane 36' is much smaller than the corresponding spacing 38' of articulation axis 27'. The two articulation axes 25', 27' are also at right angles to their longitudinal extension and are displaced with respect to one another parallel to the bearing plane 36' by an amount which is smaller, namely roughly half as small as their reciprocal spacing 37', 38'. Articulation axis 25' is closer to the center of bearing surface 17' than articulation axis 27'. In a view at right angles on the bearing plane 36', articulation axis 25' within the two radial end boundaries of bearing surface 17' is immediately adjacent to the boundary 30' facing portion 19', so that the bearing surface 17' in this region is directly pressed over articulation zone 24' at right angles to the bearing plane 36', while the remaining region of bearing surface 17' provide on portion 18' constructed in the manner of a freely projecting arm forms a further support over which the tension is distributed. Portions 18' and 19' are so strongly cross-sectionally dimensioned that they are virtually not resilient. However, that part of portion 18' on the side of portion 19' remote from the median plane of slot 28' has a slight resilient mobility about an axis located in this median plane and can be so constructed that the bearing surface 17' in the relaxed state has a slight concave curvature, whose apex is located in the median plane of slot 28'. In the fastening position this curvature is straightened under the tensile forces which occur, so that the bearing surface 17' uniformly engages over its entire extension 39' radial to articulation axes 25', 27'. The further articulation zone formed in this way is consequently integrated with articulation zone 24', is much more rigid compared with the latter and is slightly displaced towards the free end of bearing surface 17'. The median plane of slot 28' is located between the boundaries of bearing surface 17'. At the free end, portion 18' is provided with a bevel or rounded portion 40' connected on to the bearing surface 17', so that during assembly and in the case of sloping positions with respect to panel 2', portion 18' is softly supported in the vicinity of bevel 40' or the like. The spacing of radially outer face 41' of portion 19' from the central axis 5' is so much smaller than the associated portions of boundary 15' of opening 14' from central axis 5', that face 41' always has an adequate spacing from boundary 15' for the mobility of portion 19' in the longitudinal direction of bearing surface 17'. However, the latter spacing is kept very small, namely smaller than the distance of boundary 30' from face 41'. Viewed axially on the central axis 5', the free end of bearing surface 17' only extends roughly up to the radially inner boundary of bearing surface 13', so that under the tensions which occur and within narrow limits there is also a possible resilient action of panel 2', because it is not directly supported opposite to the bearing surface 17'.

As shown in FIG. 14, bearing surface 17' is cross-sectionally curved symmetrically to axial plane 21' and on both sides the curved region passes continuously or tangentially into a flank 42' passing away from the bearing plane 36' under an acute angle and which extends up to the associated lateral face 22'. FIG. 13 diagrammatically shows the lever geometry of tension member 16'. The continuous lines illustrate the fastening position of portion 18' in which bearing surface 17' is located in the bearing plane 36'. A further fastening position is indicated by dot-dash lines in which the bearing surface of portion 18' is located in another fastening position in bearing plane 36a', which is e.g. displaced with respect to bearing plane 36' through panel 2' having a reduced thickness as a result of tolerance differences, this difference being shown exaggeratedly large in FIG. 13. In all fastening positions the bearing surface 17', which is substantially exclusively connected in articulated manner to portion 20' by means of two articulation axes, can be located parallel to any other possible fastening position or, adapted to the mating surface, slopes with respect thereto. Bearing surface 17' performs a small relative movement in its longitudinal direction between bearing planes 36', 36a'. Within the maximum spacing between bearing planes 36', 36a' for which the tension member 16' is designed, the movement angles in the vicinity of both articulation zones 24', 26' are substantially the same and very small, so that the tensions which occur are also roughly of the same magnitude. FIG. 13 shows in an exaggeratedly deflected form by a double dot-dash line the relaxed state of tension member 16', in which portion 18' with bearing surface 17' is no longer plane-parallel to the fastening positions and instead forms a smaller angle with respect to the connecting lines between articulation axes 25', 26', so that it already has a relatively high pretension with respect to portion 19' on reaching the fastening position.

The two tension members 16' are brought into bayonet catch-like engagement with panel 2' from the inside 9' of the latter. For this purpose and for each tension member 16' is provided in the boundary 15' of opening 14', a rectangular cutout 43' adapted to said tension member 16' and which extends approximately into the vicinity of bearing surface 13'. After portions 18' of tension members 16' pass through cutouts 43', said members are rotated to the left by an acute angle of e.g. approximately 30° about the central axis 5' with respect to panel 2' according to FIGS. 9 and 11. The front flank 42' of each tension member in the rotation direction runs on to the associated boundary of cutout 43', so that accompanied by the build up of the pretension, portion 18' is deflected about the associated articulation axes 25', 27' and its bearing surface 17' reaches the associated side 8' of panel 2', so that means 3' is axially positively secured and in the rotation direction is at least non-positively secured.

For the positive securing of means 3' in the rotation direction, two locking members 44' are also provided on said means, which are constructed in one piece with tension members 16' or casing cover 11' and are displaced about the central axis 5' by 90° with respect to tension members 16'. Two rectangularly defined locking recesses 14' are provided in boundary 15' of opening 14' for receiving locking members 44' and in which the latter only engage positively in the rotation direction. According to FIG. 15, each locking member 44' is constructed in the manner of a spring tongue projecting roughly parallel to the central axis 5' over the casing cover 11' and which projects by roughly the same distance as tension members 16' and passes via a cross-sectionally weakened articulation zone 46' in one piece into portion 20' or casing cover 11'. Articulation zone 46' is bounded by the rounded base surface of a slot 48', which is provided on the same side as slots 33' in casing cover 11', so that also the articulation zone 46' defining an articulation axis 47' is located in the axial plane of articulation axis 27' at right angles to central axis 5' on the side of casing cover 11' remote from the bearing plane 36'. On part of its length following on to articulation zone 45', locking member 44' is also laterally guided in an opening 49' of casing cover 11' corresponding to opening 23', the radial spacing of articulation axis 47' from central axis 5' being larger than that of articulation axis 27'. On the side remote from central axis 5', locking member 44' is provided in the vicinity of its free end with a run-up slope 50' with which the locking member 44' runs up on to the boundary 15' of opening 14' on inserting in panel 2', so that it is pressed resiliently inwards about articulation axis 47' into the position shown by dot-dash lines in FIG. 15. On turning means 3', locking member 44' then slides with its surface remote from central axis 5' along boundary 15' until it springs into locking engagement in the associated locking recess 45'. Both portions 18' and also the ends of locking members 44' projecting over the outside 8' of panel 2' in the fastening position form handles which, after removing the operating knob 10' are accessible from the outside 8' of panel 2', to on the one hand disengage the locking members 44' and on the other to move the tension members 16' into the vicinity of cutouts 43' by rotating about central axis 5', so that means 3' can be detached from the outside of panel 2'. Locking members 44' are also radially spaced from the radially inner boundary of bearing surface 13'.

We claim:

1. A fastening mechanism for mounting an equipment body of a piece of operating equipment, such as control equipment, electrical power control switching means and the like in the vicinity of at least one opening on a panel, the opening being defined by a boundary, said fastening mechanism comprising:

holding members associated with the equipment body and supported against opposite associated sides of the panel in a fastening position, said holding members having supporting surfaces for support purposes, at least one holding member being provided as a tension member engaging the associated side of the panel with pretension due to a supporting force occurring in the fastening position, at least one tension member being arranged in an at least slightly movable manner on the equipment body with respect to the boundary of the opening, wherein at least one of the tension members has a head portion provided on a shank portion passing through the opening, said head portion forming at least one of the supporting surfaces, the tension member in the fastening position being resiliently movable of itself by means of at least one articulation zone provided in the tension member, thereby compensating in the fastening position the position of the supporting surface with respect to the panel under the supporting force occurring.

2. A mechanism according to claim 1, wherein the tension member has lateral supporting surfaces of different shaped profile provided on the head portion on either side of a median plane, in the fastening position said supporting surfaces resting against the panel in a main pretension direction oriented substantially at right angles to the panel and engaging two opposite lateral sides provided in the vicinity of the associated side of the panel and adjacent to a passage opening in the panel for the shank portion, the orientation of the supporting surfaces with respect to the median plane located between them differing in such a way from a mirror symmetrical orientation but at least one supporting surface in the fastening position is exposed to a transverse tension component directed substantially at right angles to the main pretension direction, said supporting surface thereby forming a transverse tension surface.

3. A fastening mechanism for mounting an equipment body of a piece of operating equipment, such as control equipment, electrical power control switching means and the like in the vicinity of at least one opening defined by a boundary on a panel, said fastening mechanism comprising holding members associated with the equipment body and supported against opposite associated sides of the panel in a fastening position, said holding members having supporting surfaces for support purposes, at least one holding member being provided as a tension member engaging the associated side of the panel with pretension of a supporting force occurring in the fastening position, said boundary having boundary edges on edge faces, wherein at least one boundary edge of an edge face of the passage opening forms at least one cutting edge penetrating into the associated support surface of the tension member.

4. A mechanism according to claim 1, wherein the tension member forms a spring member with respect to a pretension direction, the tension member being movably arranged on the equipment body substantially in said pretension direction about an articulation axis of a first articulation zone, at least one tension member in the fastening position being at least partly provided for engagement on the associated side of the panel at a distance from the boundary of the opening, said tension member being resiliently pivotable with respect to the equipment body about at least one further articulation zone, said further articulation zone being spaced from the first articulation zone, thereby providing means for self-compensating engagement of the supporting surface over its extension at right angles to the articulation axis of the first articulation zone.

5. A mechanism according to claim 2, further comprising at least one transverse tension surface forming one of the supporting surfaces, the transverse tension surface having a wedge face for engaging on the associated boundary edge of the edge face of the passage opening, the transverse tension surface being positioned under an acute angle opening towards the end of the head portion with respect to the median plane.

6. A mechanism according to claim 2, wherein both lateral supporting surfaces have wedge faces, a maximum spacing between said lateral supporting surfaces being larger than an associated width of the passage opening, the wedge face facing the transverse tension face being positioned at a smaller angle with respect to the median plane and the transverse tension face.

7. A mechanism according to claim 2, wherein at least one lateral supporting surface provided as a main tension surface has a shoulder surface provided for resting against the associated side of the panel only at a distance from the boundary of the passage opening.

8. A mechanism according to claim 2, wherein said tension member is connected to a base portion by a connecting portion, the shank portion of the tension member carrying the head portion being elastically resiliently deformable of itself as well as in the vicinity of the connecting portion in a direction provided substantially in the direction of the transverse tension component.

9. A mechanism according to claim 8, wherein the shank portion of the tension member has a shank base forming a bar connected only at two ends to the base member in one part.

10. A mechanism according to claim 9, wherein the base member is plate-like, said base member being traversed on either side of the tension member and, respectively, on either side of the median plane by slots substantially covered by the head portion.

11. A mechanism according to claim 2, wherein on either side of the head portion of the tension member shoulder surfaces are provided, said should surfaced being offset with respect to each other in the main tension direction, at least one of said shoulder surfaces being in a tilted position with respect to the median plane.

12. A mechanism according to claim 2, wherein the tension member is cross-sectionally substantially T-shaped and wherein a connecting portion between the shank portion and at least one shoulder surface is formed by an associated wedge surface.

13. A mechanism according to claim 4, wherein the articulation axes of the articulation zones of the tension member are provided substantially parallel to one another, substantially parallel to a wall plane of the panel and substantially at right angles to an axial plane of the opening.

14. A mechanism according to claim 4, wherein the panel has a panel thickness to be measured at right angles to a median panel plane, the articulation axes of the articulation zones being positioned at a distance from the median panel plane, said distance for at least one articulation axis being several times larger than the panel thickness.

15. A mechanism according to claim 1, wherein the opposite sides of said panel define an inner side and an outer side, the articulation axes being positioned close to the outer side and close to an end of the supporting surface, said end in the fastening position being provided adjacent to the boundary of the opening.

16. A mechanism according to claim 1, wherein in the fastening position one of the articulation axes is provided on the inner side of the panel at a distance opposite to the supporting surface.

17. A mechanism according to claim 4, wherein the mechanism defines a central axis, the articulation axes of the articulation zones of the tension member being displaced with respect to one another in a direction parallel to the median panel plane, one of the articulation axes positioned closer to the supporting surface of the tension member being radially outwardly displaced with respect to the central axis by a greater distance than the other articulation axis.

18. A mechanism according to claim 1, wherein at least one articulation zone is constructed in one piece with adjacent portions of the tension member, the articulation zone being formed by a cross-section zone reduced with respect to the adjacent member portions and bounded by a rounded base surface of at least one slot, the tension member being made from a material with high spring rigidity.

19. A mechanism according to claim 1, wherein the supporting surface of at least one tension member is offset with respect to an adjacent member portion following on to the equipment body by a depressed recess, the recess forming a boundary of the associated articulation zone and being laterally displaced with respect to an associated slot.

20. A mechanism according to claim 1, wherein at least one tension member is constructed in the manner of a substantially rectangularly Z-shaped tension leg.

21. A mechanism according to claim 1, wherein in cross-section parallel to at least one articulation axis in the articulation zone the supporting surface of at least one tension member is bounded substantially in the manner of an edge bearing surface, the supporting surface being convexly curved and bounded on at least one side by a sloping flank.

22. A mechanism according to claim 1, wherein in bayonet catch-like manner the passage opening has an insertion portion widened at least to the width of the tension member head portion, a retaining portion following on to the insertion portion, said retaining portion being narrowed with respect to the width of the head portion and provided for engagement in the fastening position and provided for engagement in the fastening position by moving the tension member from the insertion portion into the retaining portion.

23. A mechanism according to claim 5, wherein the tension member and the panel engage in one another rotational about an actuating axis spaced from the tension member, at least one wedge face being substantially curved about said actuating axis, the main tension surface being located on a side of the head portion remote from the actuating axis.

24. A mechanism according to claim 1, wherein at least one securing member is provided for securing the fastening position of the tension member, the securing member having at least one resiliently removable securing cam for engaging in a securing opening in the panel.

* * * * *